United States Patent
Brohm et al.

(10) Patent No.: US 11,236,727 B2
(45) Date of Patent: Feb. 1, 2022

(54) METHOD FOR FORMING A WIND TURBINE FOUNDATION AND RELATED SYSTEM FOR FORMING SUCH A FOUNDATION

(71) Applicant: Vestas Wind Systems A/S, Aarhus N. (DK)

(72) Inventors: Anders Brohm, Frederiksberg C (DK); Søren P. Jensen, Varde (DK); Børge Øllgaard, Esbjerg (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 15/780,386

(22) PCT Filed: Nov. 25, 2016

(86) PCT No.: PCT/DK2016/050397
§ 371 (c)(1),
(2) Date: May 31, 2018

(87) PCT Pub. No.: WO2017/108043
PCT Pub. Date: Jun. 29, 2017

(65) Prior Publication Data
US 2018/0355851 A1    Dec. 13, 2018

(30) Foreign Application Priority Data

Dec. 21, 2015    (DK) .................... DKPA 2015 70845

(51) Int. Cl.
*F03D 13/20*    (2016.01)
*E02D 27/42*    (2006.01)
*E04H 12/34*    (2006.01)

(52) U.S. Cl.
CPC .......... *F03D 13/22* (2016.05); *E02D 27/425* (2013.01); *E04H 12/34* (2013.01);
(Continued)

(58) Field of Classification Search
CPC ........ F03D 13/22; E02D 27/425; E04H 12/34
See application file for complete search history.

(56) References Cited

U.S. PATENT DOCUMENTS

| 4,438,607 A | * | 3/1984 | Nelson | E02D 27/00 52/126.1 |
| 5,110,082 A | * | 5/1992 | Rowan, Jr. | F16M 7/00 248/649 |

(Continued)

FOREIGN PATENT DOCUMENTS

| CN | 202073113 U | 12/2011 |
| CN | 203096756 U | 7/2013 |

(Continued)

OTHER PUBLICATIONS

Derwent Abstract for CN 106639610 A (Year: 2017).*

(Continued)

*Primary Examiner* — Brian D Mattei
*Assistant Examiner* — Charissa Ahmad
(74) *Attorney, Agent, or Firm* — Wood Herron & Evans LLP

(57) ABSTRACT

A method of forming a wind turbine foundation includes providing an anchor cage in an excavation pit, the anchor cage including an upper flange, a lower flange, and a plurality of anchor bolts extending therebetween. A first cementitious material is directed into the excavation pit so that the anchor cage becomes at least partially embedded in the material, which is allowed to cure to form a rigid body. A connecting element is selectively engaged with the upper flange and an actuating element is positioned in operative relation with the connecting element, the connecting and actuating elements positioned in non-contact relation with the anchor bolts. The actuating element is actuated relative to the connecting element to raise the upper flange from the rigid body into a leveled position. A second cementitious (Continued)

material is directed into a space beneath the raised upper flange and is allowed to cure to form a support layer.

17 Claims, 16 Drawing Sheets

(52) U.S. Cl.
CPC ... *F05B 2240/912* (2013.01); *F05B 2260/301* (2013.01); *Y02E 10/728* (2013.01)

(56) References Cited

U.S. PATENT DOCUMENTS

| | | | | |
|---|---|---|---|---|
| 5,678,382 | A * | 10/1997 | Naito | E02D 27/42 |
| | | | | 52/295 |
| 5,826,387 | A | 10/1998 | Henderson et al. | |
| 7,374,369 | B2 * | 5/2008 | Jakubowski | E02D 27/42 |
| | | | | 405/233 |
| 7,618,217 | B2 * | 11/2009 | Henderson | E04H 12/085 |
| | | | | 405/239 |
| 8,037,646 | B2 * | 10/2011 | Wobben | E02D 27/42 |
| | | | | 405/243 |
| 8,220,214 | B1 * | 7/2012 | Purdy | E02D 27/42 |
| | | | | 248/678 |
| 8,272,181 | B2 * | 9/2012 | Tooman | E02D 27/42 |
| | | | | 52/295 |
| 8,555,518 | B2 * | 10/2013 | Tooman | E02D 27/42 |
| | | | | 33/645 |
| 8,857,131 | B2 * | 10/2014 | Vogel | F03D 13/10 |
| | | | | 52/745.17 |
| 9,003,721 | B1 * | 4/2015 | Jensen | E04H 12/34 |
| | | | | 52/126.6 |
| 9,080,306 | B2 * | 7/2015 | Ollgaard | E04G 21/185 |
| 10,385,533 | B2 * | 8/2019 | Jeon | E02D 27/425 |
| 10,422,323 | B2 * | 9/2019 | Sandvad | E02D 37/00 |
| 2009/0044482 | A1 | 2/2009 | Tooman | |
| 2011/0131899 | A1 * | 6/2011 | Voss | E02D 27/42 |
| | | | | 52/173.1 |
| 2011/0138720 | A1 * | 6/2011 | Tooman | E02D 27/42 |
| | | | | 52/295 |
| 2013/0125480 | A1 * | 5/2013 | Maestre | E02D 27/42 |
| | | | | 52/126.1 |
| 2015/0089898 | A1 | 4/2015 | Wobben | |
| 2018/0355851 | A1 * | 12/2018 | Brohm | E02D 27/425 |

FOREIGN PATENT DOCUMENTS

| | | | | |
|---|---|---|---|---|
| CN | 104110353 | A | | 10/2014 |
| CN | 203960895 | U | | 11/2014 |
| CN | 102758445 | B | | 1/2015 |
| CN | 204510255 | U | | 7/2015 |
| DE | 202009015344 | U1 | | 9/2010 |
| EP | 2041371 | B1 | | 4/2009 |
| EP | 2664714 | A1 | | 11/2013 |
| EP | 2871289 | A1 | | 5/2015 |
| JP | 59138778 | A * | 8/1984 | ............ F03B 11/02 |
| JP | 10121576 | A * | 5/1998 | ............ F03B 11/02 |
| JP | 10252278 | A * | 9/1998 | |

OTHER PUBLICATIONS

Derwent Abstract for CN 103556652 A by Cong et al. (Year: 2014).*
Machine Translation for CN 203960895 U by Cong et al. obatined from the European Patent Office on Apr. 24, 2020 (Year: 2014).*
European Patent Office, International Search Report and Written Opinion in PCT Application Serial No. PCT/DK2016/050397, dated Mar. 15, 2017.
Danish Patent and Trademark Office, Search and Examination Report in PA 2015 70845, dated Jun. 20, 2016.
China National Intellectual Property Administration, First Notification of Office Action in CN Application No. 201680075086.1, dated Aug. 5, 2019.

* cited by examiner

METHOD FOR FORMING A WIND TURBINE FOUNDATION AND RELATED SYSTEM FOR FORMING SUCH A FOUNDATION

TECHNICAL FIELD

The present invention relates generally to wind turbines, and more particularly to methods for forming wind turbine foundations.

BACKGROUND

Wind turbines are used to produce electrical energy using a renewable resource and without combusting a fossil fuel. Generally, a wind turbine converts kinetic energy from the wind into electrical power. A horizontal-axis wind turbine generally includes a tower, a nacelle located at the apex of the tower, and a rotor having a plurality of blades and supported in the nacelle by a shaft. The shaft couples the rotor either directly or indirectly with a generator, which is housed inside the nacelle. Consequently, as wind forces the blades to rotate, electrical energy is produced by the generator.

Horizontal-axis wind turbines may be anchored on land by securing a lower portion, such as a lower tower flange, of the wind turbine tower to a foundation that extends into the ground. Conventional foundations include steel-reinforced concrete structures arranged within an excavation pit. The structure includes a centrally positioned steel anchor cage that is generally cylindrical and includes upper and lower annular steel flanges arranged horizontally, and a plurality of high-strength steel anchor bolts extending vertically between the flanges.

In conventional methods, the anchor cage is positioned within the excavation pit and concrete is then poured into the pit so that the anchor cage becomes embedded within the concrete. Once the poured concrete cures, the upper flange is lifted from an upper surface of the cured concrete body to expose an annular trough. High strength grout is then directed underneath the upper flange and into the trough, and is allowed to cure to form an annular grout support layer. The lower tower flange of the wind turbine is then lowered over the upper ends of the anchor bolts such that the grout support layer is positioned between the lower tower flange and the steel-reinforced concrete body of the foundation. Nuts are tightened onto the upper ends of the anchor bolts, thereby tensioning the anchor bolts and maintaining the foundation under heavy compression, which is advantageous for counteracting overturning moments exerted by the wind turbine during use. The grout support layer functions to maintain the wind turbine in a leveled orientation, and to transfer loads from the wind turbine tower to the foundation during operation. In that regard, it is desirable to form the grout support layer so as to define a level mounting plane at which the lower tower flange may be mounted to the foundation.

Conventional wind turbine leveling methods are generally performed by using either the lower tower flange of the wind turbine, or alternatively the upper flange of the anchor cage, as an element for defining the level mounting plane. For example, some known methods include suspending and leveling the lower tower flange above the foundation, and then filling grout onto an upper surface of the foundation body up to a lower surface of the tower flange, and allowing the grout to cure to maintain the wind turbine in a leveled position. Other known methods include raising the upper flange of the anchor cage to a leveled position above the foundation body, and then filling the grout up to a lower surface of the upper flange. Once the grout cures, the tower flange may then be positioned on top of the foundation, with or without the upper flange of the anchor cage remaining in place, to maintain the wind turbine in a leveled orientation.

The latter of these wind turbine leveling methods, in which the upper flange of the anchor cage is used to define the level mounting plane, exhibit various shortcomings. Accordingly, there is a need for improvements in methods for setting wind turbine foundations and leveling wind turbines.

SUMMARY

A method of forming a wind turbine foundation according to an exemplary embodiment on the invention includes providing an anchor cage in an excavation pit formed in a ground surface. The anchor cage includes an upper flange, a lower flange, and a plurality of anchor bolts extending between the upper and lower flanges. The method further includes directing a first cementitious material into the excavation pit so that the anchor cage becomes at least partially embedded within the first cementitious material, and allowing the first cementitious material to cure to form a rigid body. The method further includes selectively engaging a connecting element with the upper flange and positioning an actuating element in operative relation with the connecting element, the connecting element and the actuating element positioned in non-contact relation with the anchor bolts. The method further includes actuating the actuating element relative to the connecting element and thereby raising the upper flange from the rigid body into a leveled position. A second cementitious material is directed into a space beneath the raised upper flange, and is allowed to cure to form a support layer.

An exemplary system for forming a wind turbine foundation includes an anchor cage having an upper flange, a lower flange, and a plurality of anchor bolts extending between the upper and lower flanges, the upper flange configured to engage a lower portion of a wind turbine. The system further includes at least one leveling apparatus including a connecting element engageable with the upper flange, and an actuating element operatively associated with the connecting element. The at least one leveling apparatus is operated to raise the upper flange from the rigid body to a leveled position, including engaging the connecting element with the upper flange and actuating the actuating element relative to the connecting element without contacting the anchor bolts with the actuating element.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

DETAILED DESCRIPTION

Figure 1:
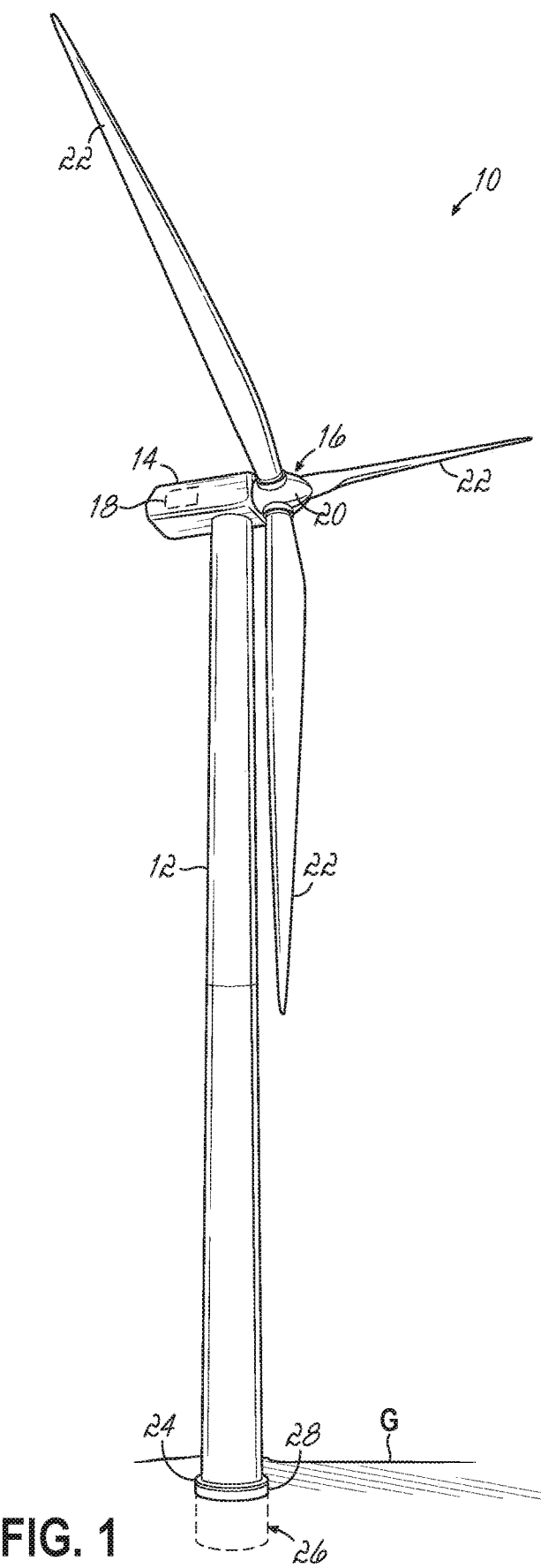
FIG. 1 is a perspective view of a wind turbine coupled to an exemplary foundation, shown schematically.

Referring to the figures, and to FIG. 1 in particular, an exemplary horizontal-axis wind turbine 10 generally includes a tower 12, a nacelle 14 disposed at the apex of the tower 12, and a rotor 16 operatively coupled to a generator 18 housed inside the nacelle 14. In addition to the generator 18, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14. The tower 12 further operates to elevate the nacelle 14 and rotor 16 to a height above ground level or sea level, as may be the case, at which faster moving air currents of lower turbulence are typically found.

The rotor 16 of the wind turbine 10 serves as the prime mover for the electromechanical system. Wind exceeding a minimum level will activate the rotor 16 and cause rotation in a substantially perpendicular direction to the wind direction. The rotor 16 of wind turbine 10 includes a central hub 20 and a plurality of blades 22 that project outwardly from the central hub 20 at locations circumferentially distributed thereabout. While the exemplary rotor 16 shown herein includes three blades 22, various alternative quantities of blades may be provided. The blades 22 are configured to interact with the passing air flow to produce lift that causes the rotor 16 to spin generally within a plane defined by the blades 22.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator 18 to the power grid as known to a person having ordinary skill in the art.

As shown in FIG. 1, the wind turbine 10 is anchored to a ground surface G by securing a lower tower flange 24 of the wind turbine tower 12 to a foundation 26, shown schematically. The foundation 26 is recessed in an excavation pit, or cavity, formed in the ground G. The foundation 26 and related components and steps of formation are described in greater detail below according to exemplary embodiments of the invention.

Figure 2:
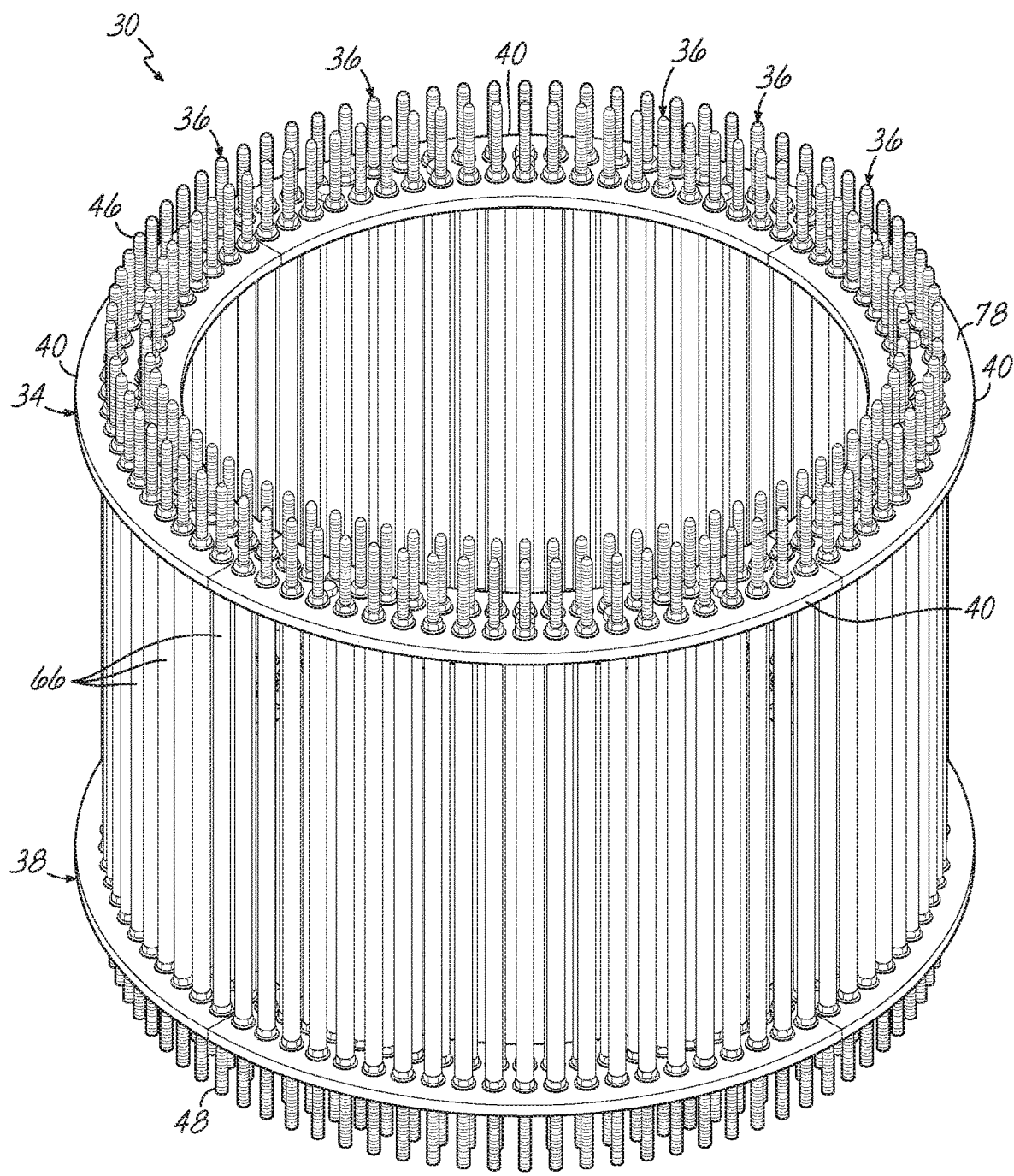
FIG. 2 is a perspective view of an anchor cage for use with a wind turbine foundation according to an exemplary embodiment of the invention.
Figure 17:
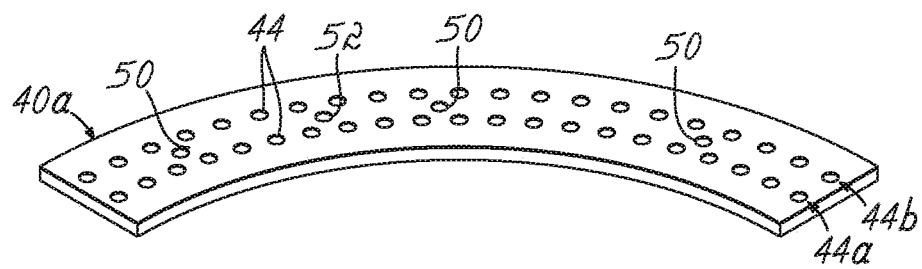
FIG. 17 is a perspective view of an arcuate segment of an upper load distribution flange according to another exemplary embodiment of the invention.

In summary, and as shown best in FIGS. 2 and 17, the completed foundation 26 generally includes a rigid body 28, an anchor cage 30 at least partially embedded within and reinforcing the rigid body 28, and a grout support layer 32 positioned between an upper load distribution flange 34 of the anchor cage 30 and an upper surface of the rigid body 28. The lower tower flange 24 is coupled to anchor bolts 36 of the anchor cage 30 and is directly supported by the load distribution flange 34, which in turn is supported in a level position by the grout support layer 32. Advantageously, the exemplary embodiments of the invention shown and described herein provide unique features and steps for leveling the load distribution flange 34 so that the wind turbine 10 may be anchored in a level and stable orientation. As used herein, the term "level" means generally horizontal, and more particularly, generally orthogonal to the direction of gravitational force.

Figure 3A:
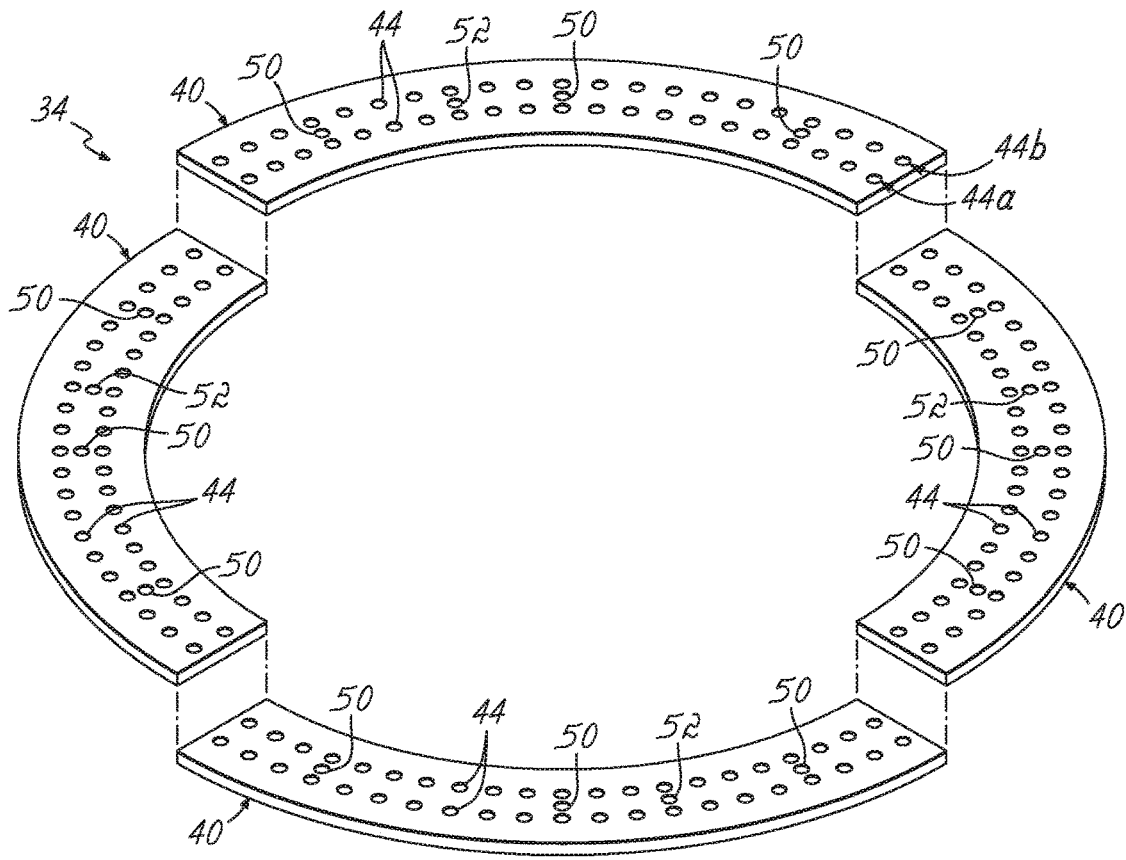
FIG. 3A is a perspective view of an upper load distribution flange of the anchor cage of FIG. 2, having a plurality of arcuate segments shown in a disassembled configuration.
Figure 3B:
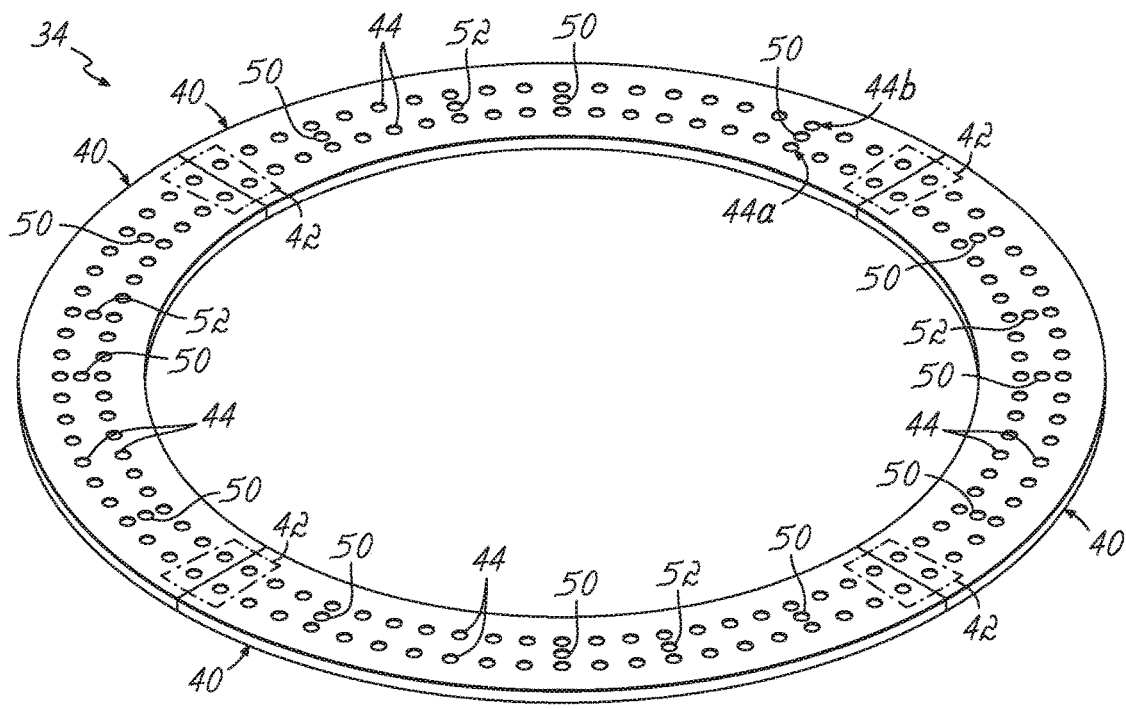
FIG. 3B is a perspective view of the load distribution flange of FIG. 3A, showing the arcuate segments in an assembled configuration.
Figure 4:
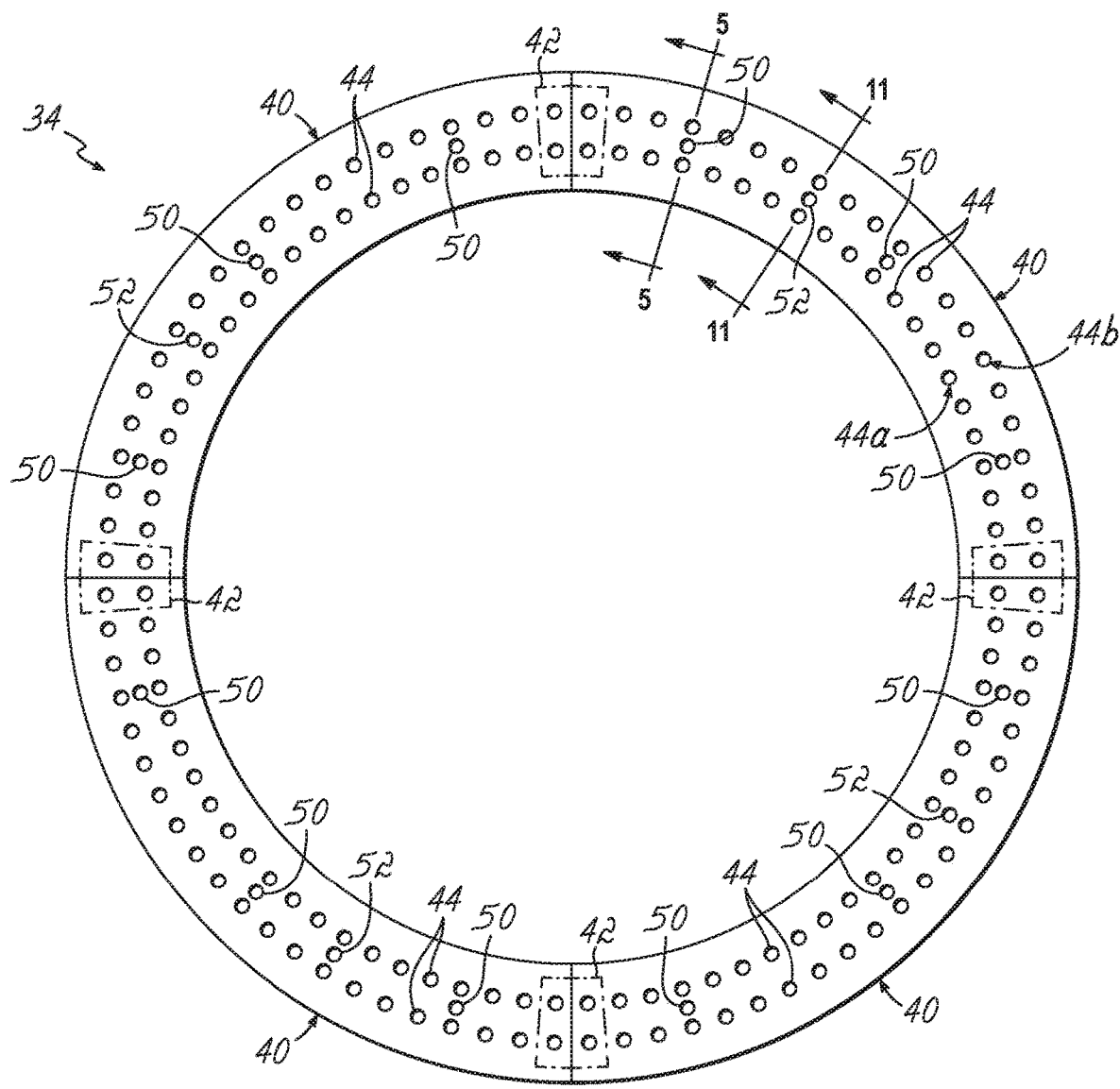
FIG. 4 is a top view of the assembled load distribution flange of FIG. 3A.

Referring to FIGS. 2-4, formation of the foundation 26 begins with the assembly of the anchor cage 30, which may be performed at the wind turbine installation site. As shown best in FIG. 2, the assembled anchor cage 30 is generally cylindrical and includes the upper load distribution flange 34, a lower base flange 38, and a plurality of circumferentially spaced anchor bolts 36 extending between the upper load distribution flange 34 and the base flange 38. The upper load distribution flange 34 and base flange 38 may be arranged generally horizontally, while the anchor bolts 36 extend generally vertically and couple the upper load distribution flange 34 to the base flange 38. The upper load distribution flange 34 and base flange 38 may be generally circular, and in particular annular, for example. The components of the anchor cage 30 may be formed of high strength steel, for example.

Referring particularly to FIGS. 3A-4, features of the upper load distribution flange 34 will now be described. Though not simultaneously described in detail, it will be appreciated that the base flange 38 may be formed with similar structural features.

The upper load distribution flange 34 may be constructed of a plurality of independently formed arcuate segments 40 coupled together at their ends using tie plates 42, shown schematically, or using any other suitable mechanical fastening elements, for example. The exemplary upper load distribution flange 34 shown herein includes four arcuate segments 40, each forming an approximately 90 degree circumferential portion of the upper load distribution flange 34, though it will be appreciated that the upper load distribution flange 34 be constructed of more or fewer arcuate segments of various circumferential sizes in alternative embodiments. In an exemplary alternative embodiment, the upper load distribution flange 34 may be formed as a single integral component that does not include multiple independently formed arcuate segments.

Advantageously, the modular nature of the anchor cage 30, attributed in part to the independently formed arcuate segments 40, facilitates efficient transport of the anchor cage components to the wind turbine installation site. On the ground G at the installation site, each arcuate segment 40 of the upper load distribution flange 34 may be coupled to a corresponding arcuate segment 40 of the base flange 38 using a corresponding plurality of anchor bolts 36, thereby forming a circumferential portion of the anchor cage 30. The circumferential portions of the anchor cage 30 may then be lowered into the excavation pit and joined together using the tie plates 42 for forming the completed anchor cage 30 within the excavation pit.

The upper load distribution flange 34 includes a plurality of circumferentially spaced bolt through bores 44 through which threaded upper ends 46 of the anchor bolts 36 are received. It will be appreciated that the base flange 38 includes a corresponding plurality of bolt through bores 44 through which threaded lower ends 48 of the anchor bolts 36 are received. The bolt bores 44 are arranged into a radially inner ring 44a for receiving a radially inner ring of the anchor bolts 36, and a radially outer ring 44b for receiving a radially outer ring of the anchor bolts 36. The inner and outer rings 44a, 44b may be radially aligned with one another such that the bolt bores 44 and respective anchor bolts 36 are arranged into circumferential spaced radial pairs, as best shown in FIG. 2. Further, the bolt bores 44 may be uniformly spaced circumferentially such that each of the arcuate segments 40 includes an equal quantity of bolt bores 44.

In exemplary embodiments, the anchor cage 30 may include approximately 64 to 144 radial pairs of anchor bolts 36 and corresponding bolt bores 44 formed on each of the upper load distribution flange 34 and base flange 38. In the illustrated exemplary embodiment, the anchor cage 30 includes 84 radial pairs of anchor bolts 36, such that each arcuate segment 40 of the upper load distribution flange 34 and base flange 38 includes 21 radial pairs of bolt bores 44. It will be appreciated that various other suitable quantities of anchor bolts 36 and bolt bores 44 may be provided in alternative embodiments.

The upper load distribution flange 34 further includes a plurality of circumferentially spaced fastening elements, shown in the form of threaded leveling through bores 50, that facilitate the leveling process described below. Each fastening element defines a respective leveling location on the upper load distribution flange 34. While shown in the form of threaded through bores 50, the fastening elements may take various alternative forms suitable for engaging the exemplary leveling apparatus 82 described below. For example, the fastening elements may be provided in the form of protrusions extending from the upper load distribution flange 34.

The leveling bores 50 may be arranged between the radially inner and outer rings 44a, 44b of the bolt bores 44, and may be provided with uniform circumferential spacing such that each arcuate segment 40 of the upper load distribution flange 34 includes an equal quantity of leveling bores 50. In the illustrated exemplary embodiment, the upper load distribution flange 34 includes twelve leveling bores 50 uniformly spaced such that each arcuate segment 40 of the upper load distribution flange 34 includes three leveling bores 50. However, it will be appreciated that various alternative quantities and configurations of leveling bores 50 may be provided. For example, less than twelve leveling bores 50 may be provided.

The upper load distribution flange 34 further includes a plurality of circumferentially spaced grouting through bores 52 through which grout, or other suitable cementitious materials, may be directed during formation of the grout support layer 32, as described in greater detail below. Accordingly, each grouting bore 52 defines a respective grouting location on the upper load distribution flange 34.

Similar to the leveling bores 50, the grouting bores 52 may be arranged between the radially inner and outer rings 44a, 44b of the bolt bores 44, and may be provided with uniform circumferential spacing such that each arcuate segment 40 of the upper load distribution flange 34 includes an equal quantity of grouting bores 52. In the illustrated exemplary embodiment, the upper load distribution flange 34 includes four grouting bores 52 uniformly spaced such that each arcuate segment 40 of the upper load distribution flange 34 includes a grouting bore 52. However, various alternative quantities and configurations of grouting bores 52 may be provided. Furthermore, while the exemplary embodiments shown and described herein include the use of bores 50 for leveling operations and bores 52 for grouting operations, it will be appreciated that each of the bores 50, 52 may be used interchangeably as either a leveling bore or as a grouting bore.

Figure 18:
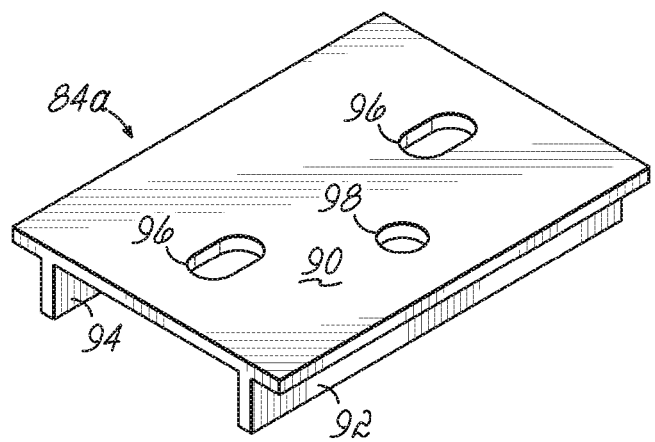
FIG. 18 is a perspective view of a leveling plate according to another exemplary embodiment, for use with the upper load distribution flange of FIG. 17.
Figure 19:
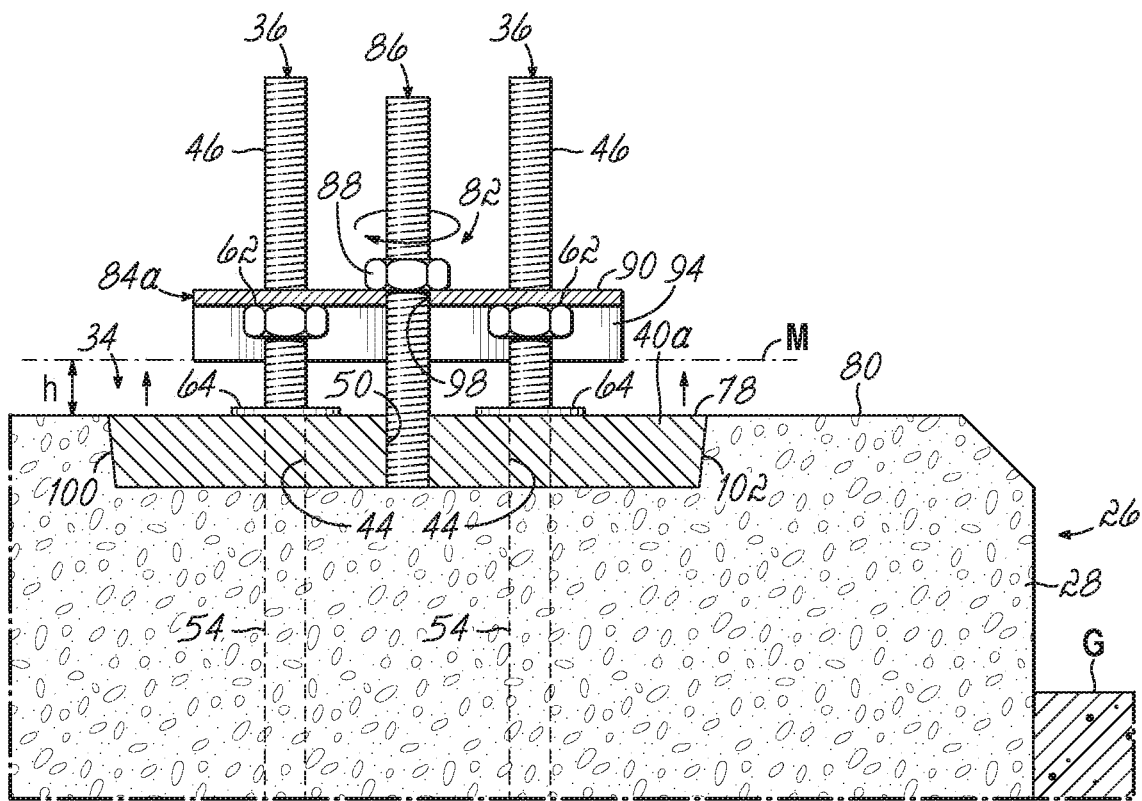
FIG. 19 is an upper radial cross-sectional view showing operation of the leveling plate of FIG. 18 in combination with the upper load distribution flange of FIG. 17.

As shown best in FIGS. 3A-4, each of the leveling bores 50 and grouting bores 52 may be positioned in radial alignment with a respective radial pair of the bolt bores 44. In an alternative exemplary embodiment, as shown in FIGS. 17-19 showing an arcuate segment 40a of an alternative exemplary upper load distribution flange, the leveling bores 50 and grouting bores 52 may be positioned circumferentially between adjacent radial pairs of bolt bores 44.

Figure 5:
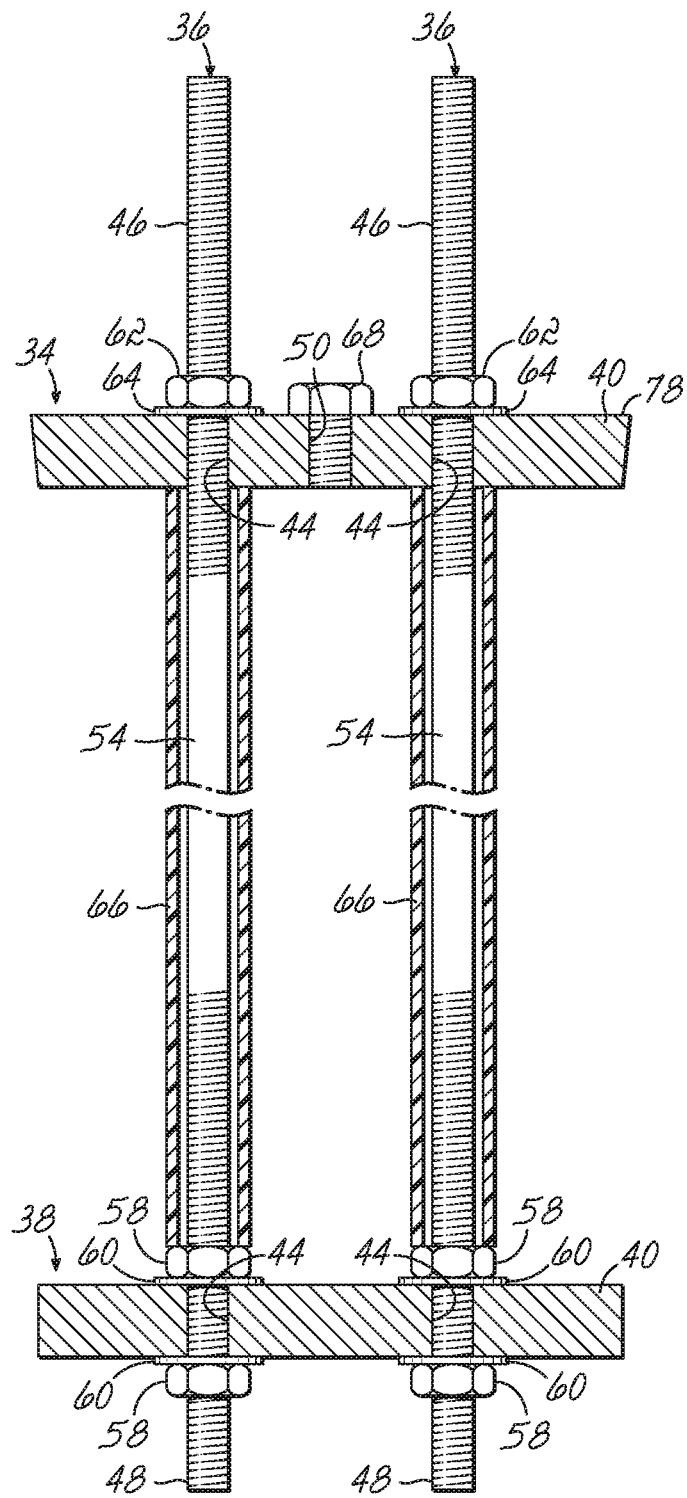
FIG. 5 is a radial cross-sectional view taken along line 5-5 shown in FIG. 4 of the anchor cage of FIG. 2, showing a radial pair of anchor bolts received within protective tubes.
Figure 5A:
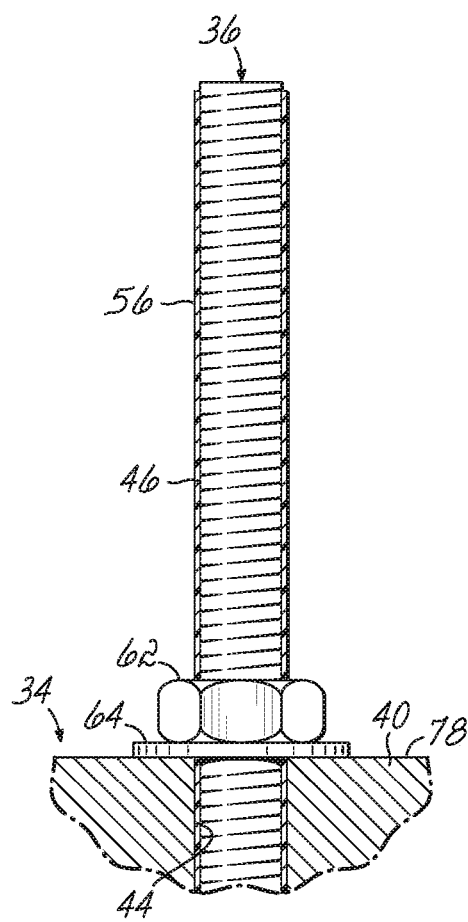
FIG. 5A is an enlarged view of FIG. 5, showing a nut and washer on an upper end of each of the anchor bolts.

Referring to FIGS. 5 and 5A, additional details of the anchor bolts 36 and the manner in which they couple to the upper load distribution flange 34 and base flange 38 are described. As described above, the anchor cage 30 may be assembled in circumferential portions, each including an arcuate segment 40 of the upper load distribution flange 34, an arcuate segment 40 of the lower base flange 38, and a plurality of anchor bolts 36 extending therebetween.

FIG. 5 shows a radial pair of anchor bolts 36 of a representative circumferential portion of the anchor cage 30. Each anchor bolt 36 extends longitudinally and includes a threaded upper end 46, a threaded lower end 48, and a central shank 54. Prior to assembling the anchor bolts 36 with the arcuate segments 40 of the upper load distribution flange 34 and base flange 38, the threaded upper end 46 of each anchor bolt 36 may be sealed with a protective covering 56, such as tape or a heat shrink hose for example, as shown in FIG. 5A.

During assembly, the threaded lower end 48 of the anchor bolt 36 is passed through a bolt bore 44 of the arcuate segment 40 of the base flange 38, and is secured thereto using upper and lower base nuts 58 and upper and lower base washers 60 that clamp the arcuate segment 40 therebetween. The threaded upper end 46 of the anchor bolt 36 is passed through a corresponding bolt bore 44 of the arcuate segment 40 of the upper load distribution flange 34, and is secured thereto using an upper load distribution flange nut 62 and an upper load distribution flange washer 64. Optionally, the portion of the anchor bolt 36 extending between the upper load distribution flange 34 and the base flange 38 may be encased within a protective tube 66, such as a PVC pipe or a heat shrink hose, for example. Advantageously, the protective tubes 66 and the protective coverings 56 may substantially shield the anchor bolts 36 from undesired contact and bonding with cementitious material during the pouring and curing steps described below.

As shown in phantom in FIG. 5, each of the leveling bores 50 and the grouting bores 52 may be fitted with a plug, shown in the form of a threaded cover bolt 68. Advantageously, the plugs substantially shield the inner surfaces of the leveling bores and grouting bores 52 from undesired contact and bonding with cementitious material during pouring and curing. In embodiments in which the plugs are in the form of threaded bolt 68, the grouting bores 52 may be threaded similarly to the leveling bores 50 for threadedly receiving the cover bolts 68.

Figure 6:
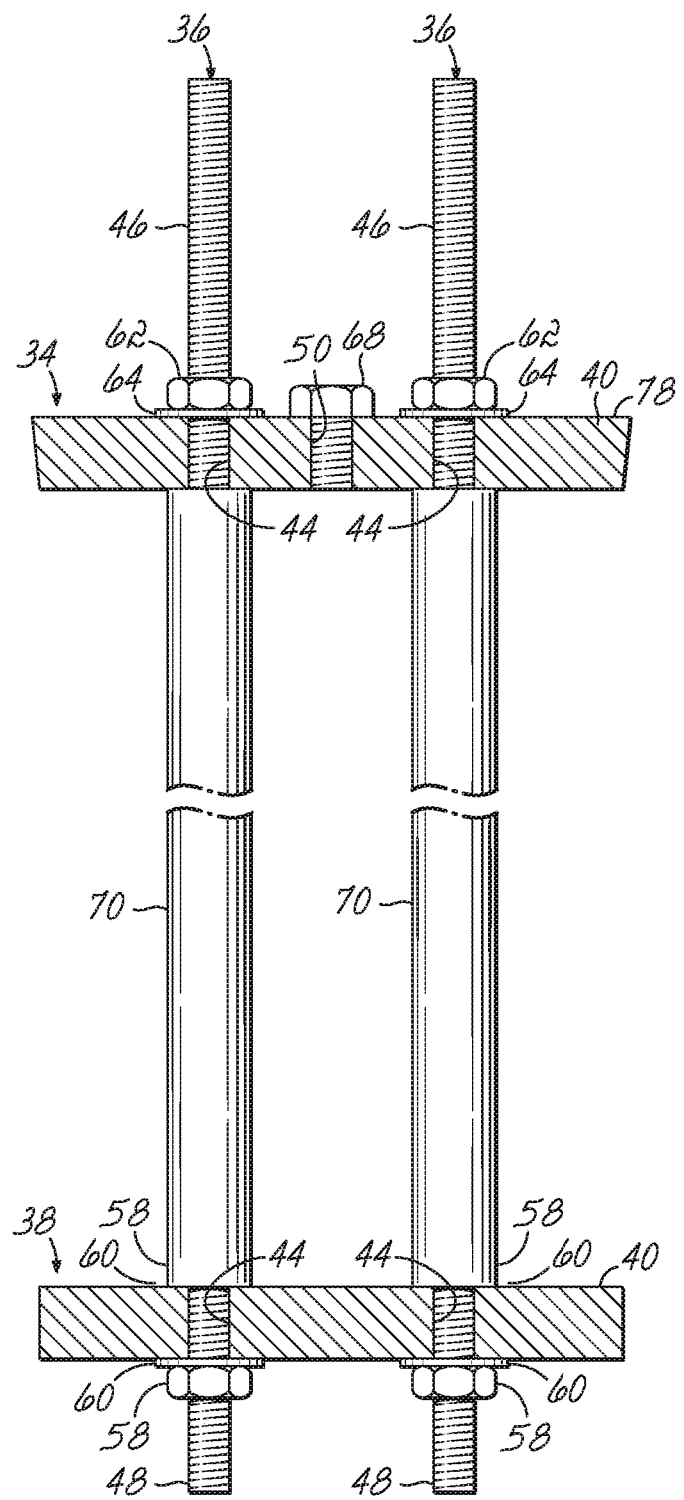
FIG. 6 is a radial cross-sectional view of the anchor cage of FIG. 2, showing a radial pair of support rods.

Referring to FIG. 6, a radial pair of support sleeves 70 may be substituted for the protective tubes 66 at select circumferential locations within the anchor cage 30, for enhancing internal structural support within the foundation 26. In an exemplary embodiment, a radial pair of support sleeves 70 may be arranged at approximately every tenth radial pair of anchor bolts 36, for example. The support sleeves 70 are formed of a material having a high compressive strength suitable for load bearing applications, such as steel, for example. Additionally, each support sleeve 70 is formed with an outer diameter that is larger than the diameters of the bolt bores 44 formed in the load distribution flange 34 and the base flange 38. Advantageously, in addition to shielding the anchor bolts 36 encased therein from undesired contact and bonding with cementitious material, the support sleeves 70 further function to support the weight of the upper load distribution flange 34 and ensure that a uniform spacing between the upper and lower flanges 34, 38 is substantially maintained prior to the addition of concrete, as described below.

Figure 7:
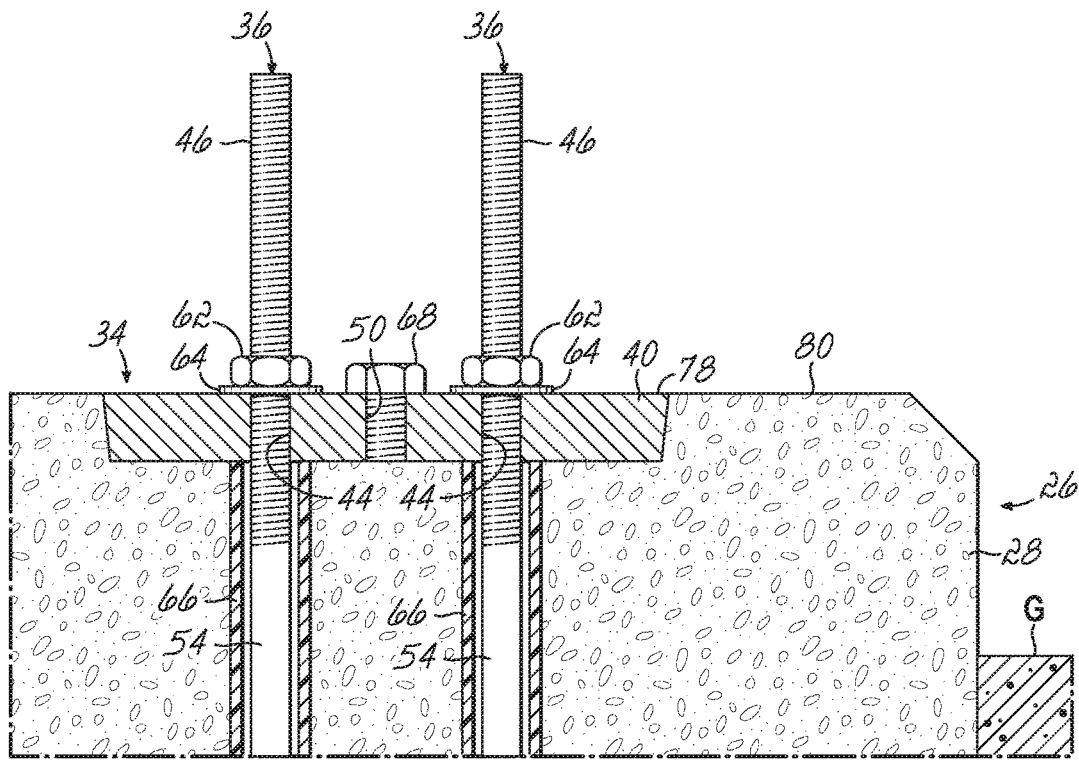
FIG. 7 is an upper radial cross-sectional view of a wind turbine foundation in the process of formation according to an exemplary embodiment of the invention, and including a rigid body reinforced by the anchor cage of FIG. 2, shown at an exemplary leveling location along line 5-5 shown in FIG. 4.

Referring to FIGS. 2 and 7, once the circumferential portions of the anchor cage 30 have been joined together within the excavation pit using tie plates 42, final positional adjustments of the assembled anchor cage 30 may be made to ensure generally central positioning within the excavation pit. The excavation pit may be lined with a form (not shown), such as large diameter piping, for defining an outer side surface of the foundation 26.

Following final positioning of the anchor cage 30 within the excavation pit, a cementitious material, such as concrete, is poured into the excavation pit so that the pit fills up to approximately an upper surface 78 of the upper load distribution flange 34. Accordingly, the anchor cage 30 is substantially embedded within the cementitious material. The poured cementitious material is then allowed a suitable length of time to adequately cure to form a rigid body 28, shown in FIG. 7. In an exemplary embodiment, the cementitious material may be allowed approximately 48 hours to cure.

As shown in FIG. 7, the protective tubes 66 and cover bolts 68 substantially shield the anchor bolts 36, leveling bores 50, and grouting bores 52 from undesired contact with the cementitious material. Prior to pouring the cementitious material, lower and side surfaces of the upper load distribution flange 34 may be coated with a lubricant, such as oil or paint for example, to facilitate separation of the upper load distribution flange 34 from the rigid body 28 for a subsequent leveling operation, described below.

Referring to FIGS. 8-11, steps for leveling the upper load distribution flange 34 according to an exemplary embodiment of the invention are shown. As described above, it is desirable to position the upper load distribution flange 34 in a leveled orientation in order to provide a level mounting surface for the wind turbine 10 during installation. It is also desirable to provide a grout support layer between the upper load distribution flange 34 and the rigid body 28 in order to facilitate load transfer from the wind turbine 10 to the foundation 26, while maintaining a rigid metal-to-metal interface between the foundation 26, via the upper load distribution flange 34, and the wind turbine 10. Advantageously, the exemplary embodiments of the invention described below provide steps and components for achieving these objectives.

FIGS. 8-11 show a representative leveling location on the upper load distribution flange 34, including a leveling bore 50 and an adjacent radial pair of anchor bolts 36 and upper load distribution flange nuts 62. It will be understood that the leveling steps described below may be similarly performed at each of the other leveling locations defined by the remaining leveling bores 50.

First, the upper load distribution flange 34 at its upper surface 78 is evaluated for any degree of slope relative to horizontal that must be corrected during leveling. Next, the height and angular orientation of a level (horizontal) mounting plane M (see FIGS. 9-11) to which the upper load distribution flange 34 is to be elevated, for example in order to adequately correct any undesired sloping, is determined. This determination may be performed using various known devices, such as a laser level, for example.

Figure 8:
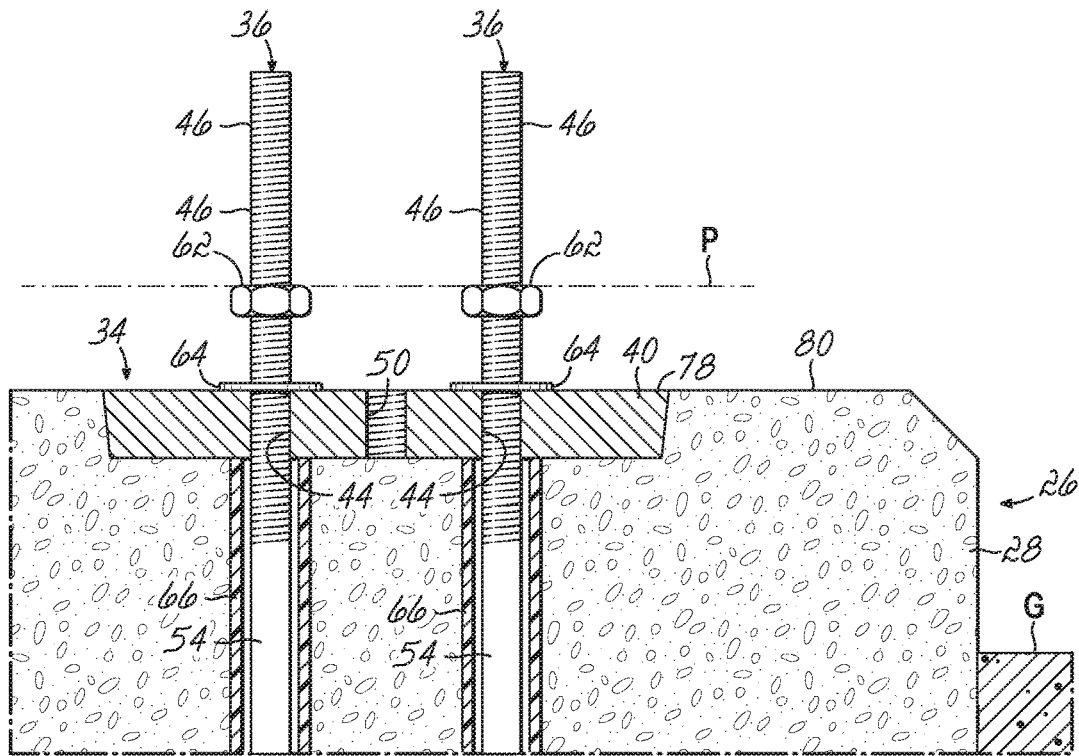
FIG. 8 is an upper radial cross-sectional view similar to FIG. 7, showing nuts in a raised position on a radial pair of anchor bolts.

As shown in FIG. 8, all of the upper load distribution flange nuts 62 on the upper load distribution flange 34 are then loosened and rotated along their respective anchor bolts 36 to suitable heights, relative to the upper surface 78 of the upper load distribution flange 34, so as to collectively define a level (horizontal) reference plane P parallel to the level mounting plane M. An offset of the level reference plane P from the level mounting plane M may be chosen based on a corresponding dimension of a leveling apparatus to be used for leveling the upper load distribution flange 34, as described in greater detail below. It will be understood that in installations in which the predetermined level planes M, P are sloped relative to the upper surface 78 of the load distribution flange 34 recessed within the rigid body 28, the upper load distribution flange nuts 62 may be positioned at differing heights relative to the upper surface 78 in order to define the level (horizontal) reference plane P. For example, at a given leveling location having a radial pair of upper load distribution flange nuts 62, a first upper load distribution flange nut 62 may be elevated to a first height and a second upper load distribution flange nut 62 may be elevated to a second height. In an exemplary embodiment, each of the upper load distribution flange nuts 62 at the leveling locations may be elevated to a height of approximately 50 mm relative to the highest point of the upper load distribution flange 34, and then individually adjusted as necessary to define the level plane P.

Figure 9:
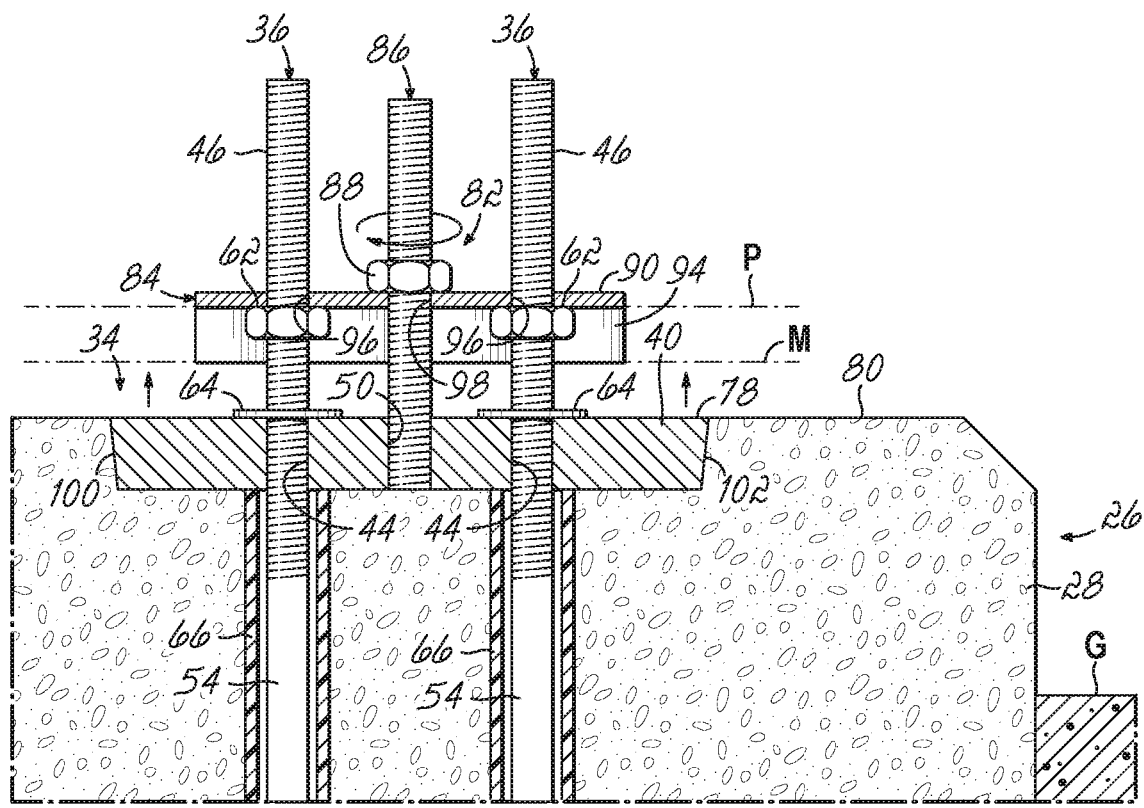
FIG. 9 is an upper radial cross-sectional view similar to FIG. 8, showing a leveling apparatus, including a leveling plate, in operative engagement with the anchor bolts and nuts.
Figure 9A:
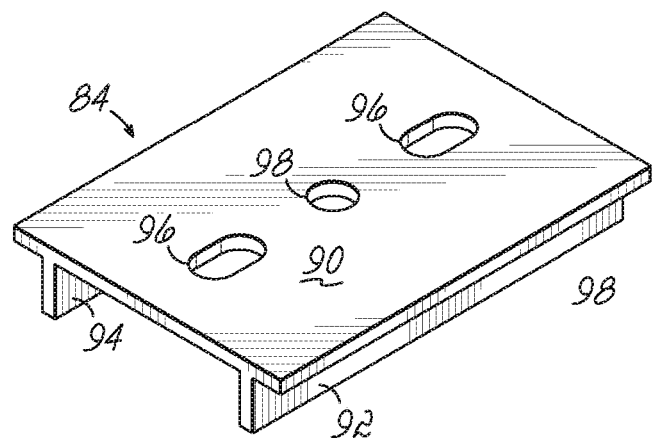
FIG. 9A is a perspective view of the leveling plate of FIG. 9.

Referring to FIGS. 9 and 9A, a plurality of leveling apparatuses 82 according to an exemplary embodiment of the invention may be used at the plurality of leveling locations to elevate the upper load distribution flange 34 from the rigid body 28 up to the level mounting plane M. Each leveling apparatus 82 includes a leveling device shown in the form of a leveling plate 84, a connecting element shown in the form of a threaded leveling rod 86, and an actuating element shown in the form of a leveling nut 88. Prior to installation of the leveling apparatuses 82, the cover bolts 68 (FIG. 7) are removed from the leveling bores 50 on the upper load distribution flange 34.

As shown best in FIG. 9A, the exemplary leveling plate 84 of each leveling apparatus 82 includes an upper plate portion 90 and first and second side plate portions 92, 94 depending downwardly from the upper plate portion 90 and parallel to one another. The upper plate portion 90 includes first and second through bores 96 sized and spaced from one another to slidably receive therethrough the threaded upper ends 46 of a radial pair of anchor bolts 36 at a leveling location. As shown, each of the first and second through bores 96 may be formed with an oblong cross-sectional shape for accommodating a range of radial spacings between the inner and outer anchor bolts 36 of a radial pair.

The upper plate portion 90 of the leveling plate 84 further includes a third through bore 98 sized to slidably receive therethrough the threaded leveling rod 86 of the leveling apparatus 82. The third through bore 98 is suitably positioned for alignment with a leveling bore 50 at any one of the leveling locations on the upper load distribution flange 34. As such, it will be appreciated that the positioning of the third through bore 98 relative to the first and second through bores 96 is similar to the positioning of a leveling bore 50 on the upper load distribution flange 34 relative to an adjacent radial pair of anchor bolts 36. For example, in the exemplary embodiment in which the leveling bores 50 are positioned in radial alignment with a pair of bolt bores 44, and corresponding anchor bolts 36, the third through bore 98 of the leveling plate 84 is similarly positioned in alignment with the first and second through bores 98. In alternative embodiments in which the leveling bores 50 are circumferentially spaced between adjacent pairs of anchor bolts 36, i.e., not in radial alignment with a pair of anchor bolts 36, the third through bore 98 of the leveling plate 84 is similarly spaced from the first and second through bores 96, such as shown by the alternative exemplary leveling plate 84*a* shown in FIG. 18.

While the exemplary leveling plates 94, 94*a* shown herein include a single grouping of first and second through bores 96 and third through bore 98, leveling plates of alternative embodiments may include multiple adjacent groupings of through bores 96, 98. For example, a leveling plate may include two adjacent rows of through bores, each row having first and second through bores 96 and a third through bore 98 positioned therebetween. Furthermore, the through bores 96, 98 of one or more of the multiple rows may each be formed with a suitable oblong, or otherwise non-circular, shape for accommodating load distribution flanges of various diameters.

As shown in FIG. 9 in connection with a representative leveling location defined by a leveling bore 50, the leveling plate 84 is fitted over the radial pair of anchor bolts 36. In particular, the threaded upper ends 46 of the anchor bolts 36 extend through the first and second through bores 96 of the leveling plate 84, and the third through bore 98 aligns with the leveling bore 50. The leveling plate 84 is lowered so that a lower surface of the upper plate portion 90 rests on top of the elevated upper load distribution flange nuts 62. Advantageously, the leveling plate 84 is not directly attached to the upper load distribution flange 34. Prior to or following application of the leveling plate 84, a lower end of the leveling rod 86 is threaded into the leveling bore 50, and an upper end of the leveling rod 86 is received through the third through bore 98 of the leveling plate 84.

As illustrated by the movement arrows shown in FIG. 9, the leveling nut 88 at each leveling location is threaded onto the leveling rod 86 and tightened against the upper surface of the upper plate portion 90 of the leveling plate 84. As the leveling nuts 88 at the plurality of leveling locations are slowly rotated further, the leveling rods 86 are gradually drawn upwardly through the leveling plates 84, thereby raising the upper load distribution flange 34 from the rigid body 28 and along the anchor bolts 36, which function as linear guides. Meanwhile, the leveling plates 84 and upper load distribution flange nuts 62 remain stationary in fixed positions relative to the anchor bolts 36. Advantageously, the leveling nut 88 at each leveling location is easily accessed for rotation and does not contact either of the adjacent anchor bolts 36. It will be appreciated that the alternative exemplary leveling plate 84*a* of FIGS. 18 and 19 functions in a manner similar to leveling plate 84.

The upper load distribution flange 34 may be formed with angled side surfaces 100, 102 that, in combination with the lubricant applied to the upper load distribution flange 34 surfaces prior to pouring the cementitious material for forming the rigid body 28, facilitate separation of the upper load distribution flange 34 from the rigid body 28. In particular, the upper load distribution flange side surfaces 100, 102 may be angled such that the upper load distribution flange 34 is formed with larger radial width at its upper surface than at its lower surface.

While the connecting element and the actuating element of the leveling apparatus 82 are shown herein in the form of threaded rod 86 and nut 88 that threadedly engages and rotates relative to threaded rod 86, it will be appreciated that these components may take various alternative forms and cooperate in various alternative manners suitable for lifting the upper load distribution flange 34 relative to the rigid body 28. In this regard, the connecting element may take any form suitable for coupling the leveling apparatus 82 to the upper load distribution flange 34 and for guiding actuation of the actuating element. Moreover, while rotation is the primary manner of actuation of the actuating element disclosed herein, various alternative manners of actuation may be suitably used. For example, in an exemplary alternative embodiment the actuating element may slide linearly along the connecting element, without rotation.

Figure 10:
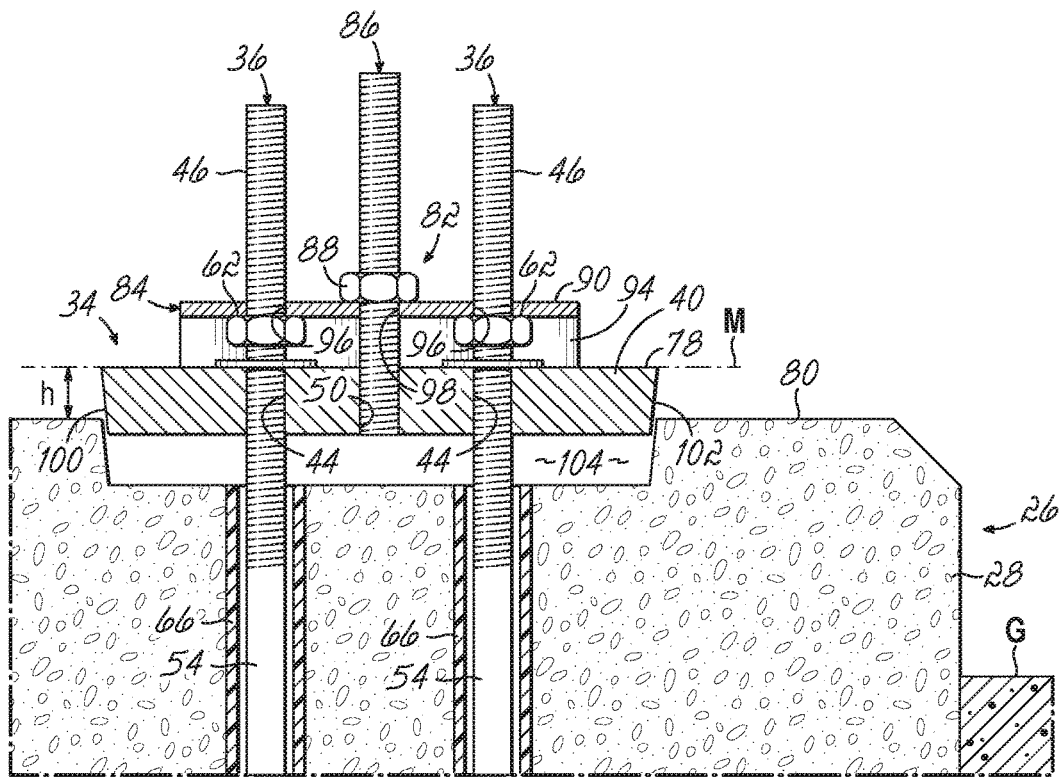
FIG. 10 is an upper radial cross-sectional view similar to FIG. 9, showing the load distribution flange raised to a leveled position to expose a trough.

As shown in FIGS. 9 and 10, the lower surfaces of the side plate portions 92, 94 of the leveling apparatuses 82 collectively define the level mounting plane M, which may be positioned at a predetermined height h relative to the preelevated position of the upper load distribution flange 34. Accordingly, at each leveling location, the leveling nut 88 is tightened on the leveling rod 86 until the upper surface of the upper load distribution flange 34 contacts the lower surfaces of the side plate portions 92, 94. In this regard, it will be understood that the length of the side plate portions 92, 94, in a direction perpendicular to the upper plate portion 90, define the offset distance between the level mounting plane M and the level reference plane P at which the upper load distribution flange nuts 62 are positioned.

Figure 11:
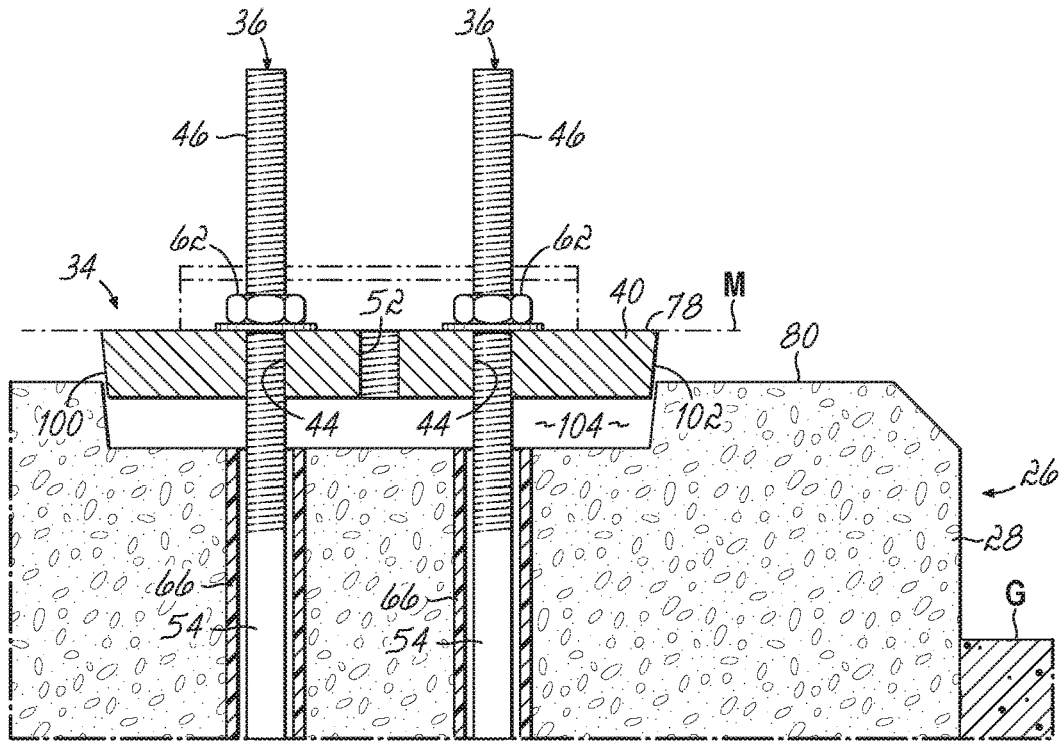
FIG. 11 is an upper radial cross-sectional view similar to FIG. 10, shown at an exemplary grouting location along line 11-11 shown in FIG. 4.

Referring now to FIGS. 11-15, a grouting operation performed at the plurality of grouting locations on the upper load distribution flange 34 is described according to an exemplary embodiment of the invention. Following leveling of the upper load distribution flange 34 described above, and prior to the grouting operation described below, the upper load distribution flange nuts 62 positioned at non-leveling locations may be hand-tightened against the upper surface 78 of the upper load distribution flange 34, as shown in FIG. 11 at a representative grouting location.

When raising the upper load distribution flange 34 up to the level mounting plane M during the leveling operation described above, a trough 104 in the rigid body 28 is exposed. As such, the upper load distribution flange 34 functions in part as a template for forming the trough 104 in the rigid body 28. In exemplary embodiments, the upper load distribution flange 34 may be raised to a level mounting plane M so as to create a trough 104 having a depth in the range of approximately 8 mm to 50 mm, such as approximately 25 mm, for example. As described below, while the upper load distribution flange 34 is suspended at the level mounting plane M by the leveling apparatuses 82, high strength grout 106 is directed into the trough 104 and cured to form grout support layer 32 for supporting the upper load distribution flange 34 at the level mounting plane M. It will be appreciated that various suitable cementitious materials other than grout may be used for forming the support layer 32 in alternative embodiments.

FIG. 11 shows a representative grouting location on the upper load distribution flange 34, defined by one of the grouting bores 52. A leveling plate 84 at an adjacent leveling location is shown in phantom. It will be understood that the grouting steps described below may be similarly performed at each of the other grouting locations defined by the remaining grouting bores 52, simultaneously or sequentially, for example. Prior to grouting, the cover bolts 68 fitted in the grouting bores 52 are removed to provide access to the trough 104 via the grouting bores 52. Additionally, water may be directed into the trough 104 for hydrating the grout 106 directed into the trough 104 thereafter.

Figure 12:
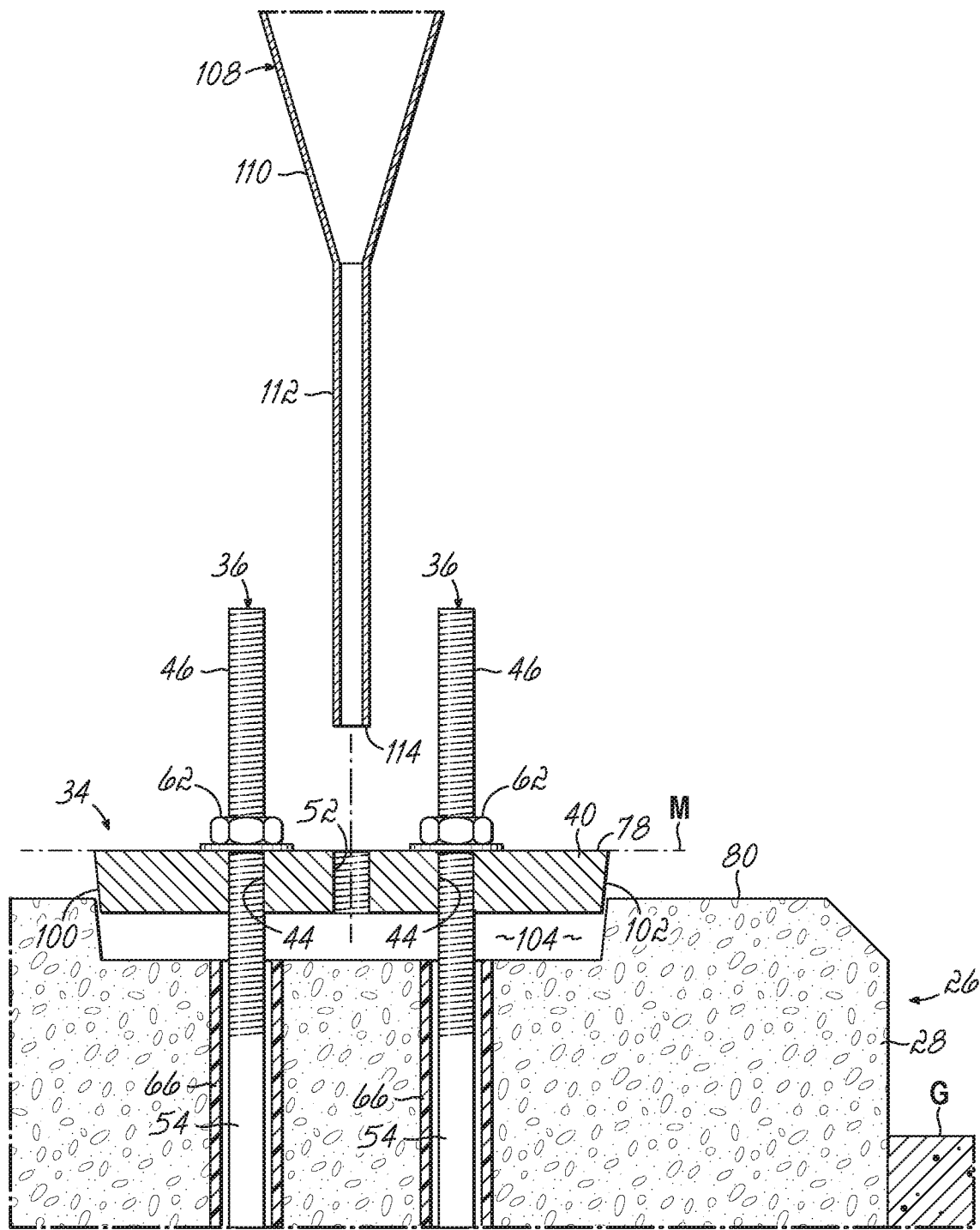
FIG. 12 is an upper radial cross-sectional view similar to FIG. 11, showing details of a material delivering device for delivering grout into the trough through the load distribution flange.
Figure 13:
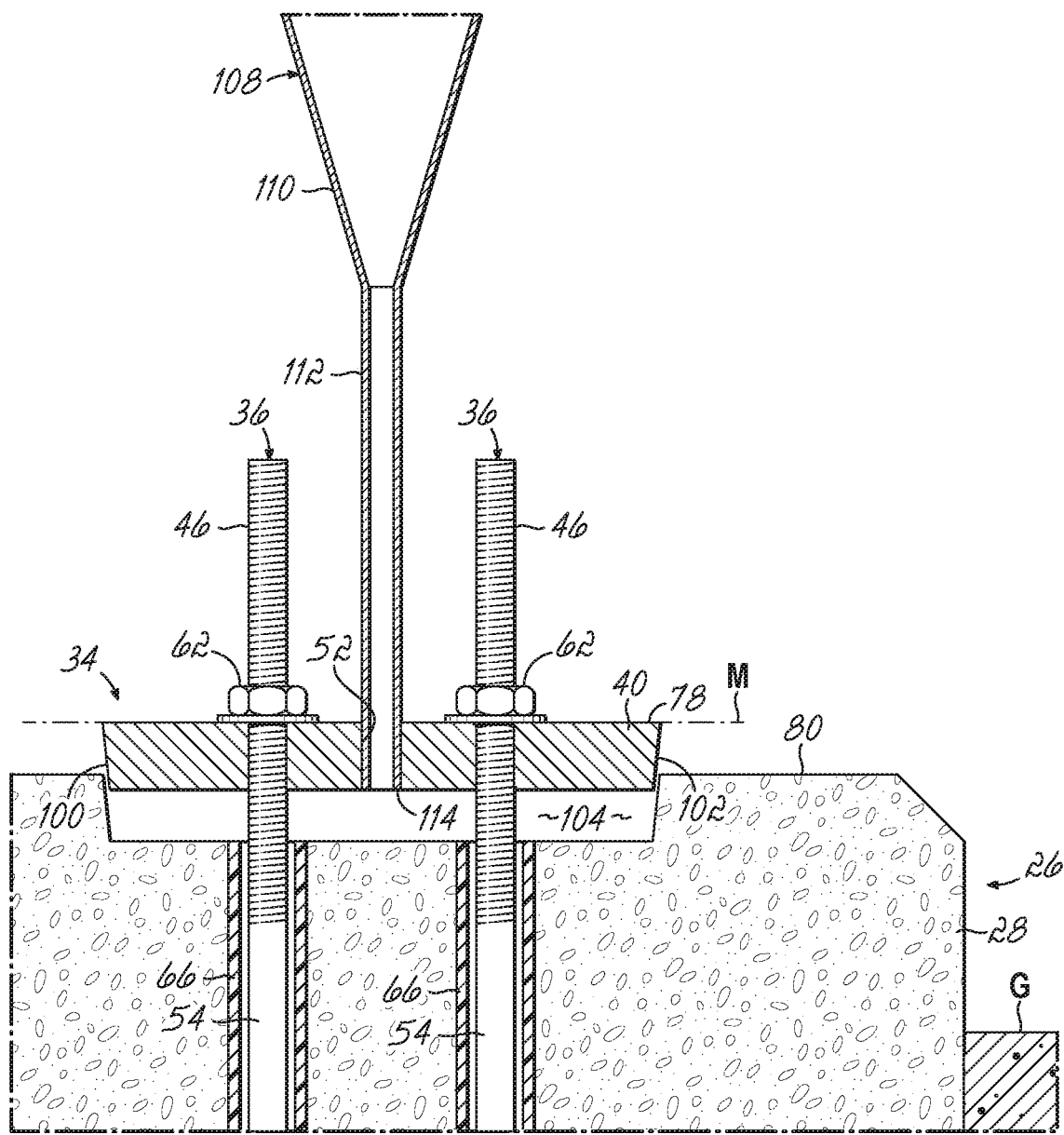
FIG. 13 is an upper radial cross-sectional view similar to FIG. 12, showing the hopper mated with the load distribution flange.
Figure 14:
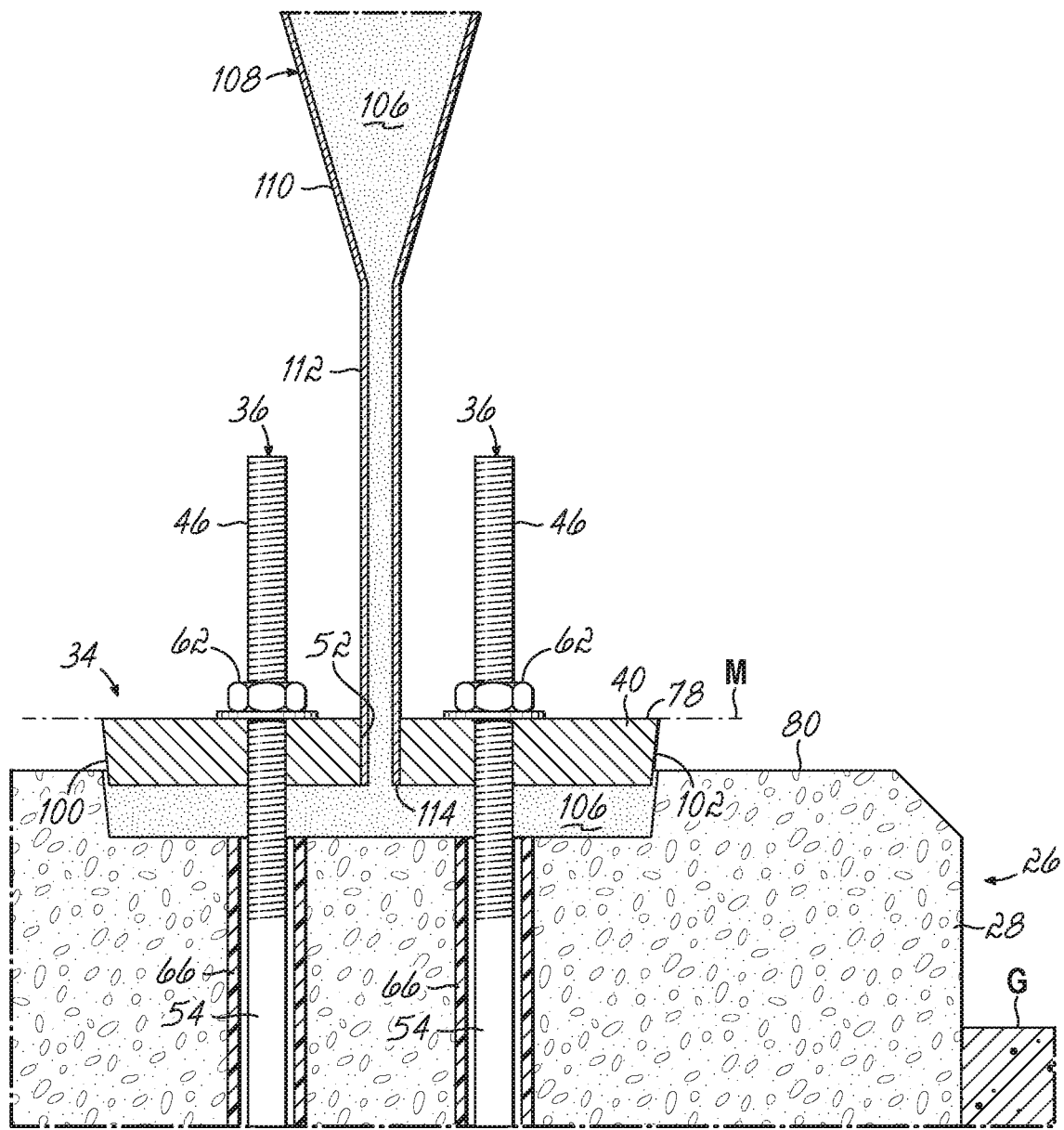
FIG. 14 is an upper radial cross-sectional view similar to FIG. 13, showing delivery of grout into the trough through the load distribution flange.

As shown in FIGS. 12-14, an exemplary grout delivery device shown in the form of a funnel-like hopper 108 may be used for delivering grout 106 into the trough 104 via a grouting bore 52. The hopper 108 generally includes a reservoir 110 for holding a supply of grout 106, and an elongate stem 112 extending from the reservoir 110 for directing the grout 106 through the grouting bore 52 and into the trough 104. The stem 112 is formed with a length suitable to provide the grout 106 flowing from the hopper 110 with a hydrostatic pressure sufficient to fill the trough 104 at each grouting location. A distal end 114 of the stem 112 may be formed with an outer diameter that is smaller than a diameter of the grouting bore 52, such that at least a portion of the distal end 114 may be received within the grouting bore 52. Using one or more hoppers 108, grout is directed into the trough 104 at each grouting location until the grout 106 seeps out from the trough 104 at the outer and inner circumferences of the upper load distribution flange 34. It will be appreciated that the hopper 108 may have various alternative configurations other than the one shown herein. Moreover, it will be appreciated that the grout delivery device may take various alternative forms, such as an injection device (not shown), which may include a pump, for example.

Figure 15:
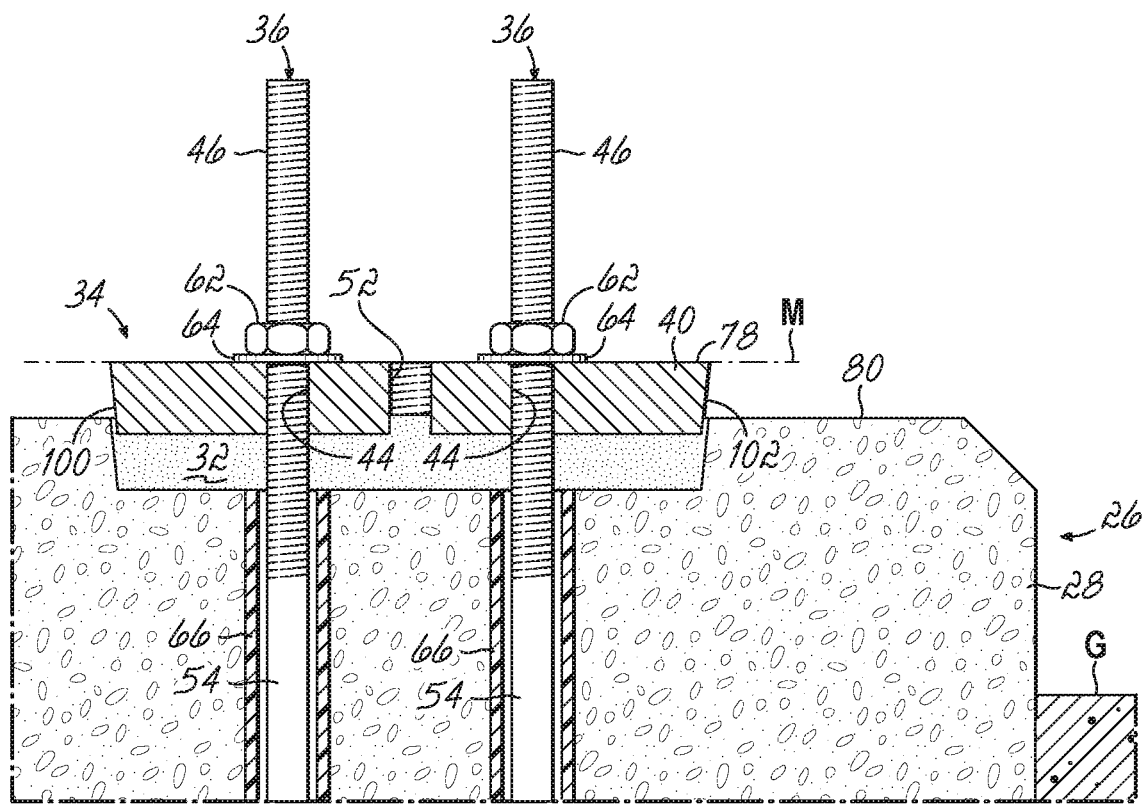
FIG. 15 is an upper radial cross-sectional view similar to FIG. 14, showing a cured grout support layer within the trough.

Referring to FIG. 15, the grout 106 directed into the trough 104 is allowed a suitable length of time to adequately cure, such as up to approximately 28 days, for example. Curing of the grout 106 forms a grout support layer 32 between the rigid body 28 and the leveled upper load distribution flange 34. Advantageously, the grout support layer 32 supports the upper load distribution flange 34 at the level mounting plane M, such that the leveling apparatuses 82 may be removed. Accordingly, the completed foundation 26 includes a rigid body 28 reinforced by the anchor cage 30, and a grout support layer 32 that supports a leveled upper load distribution flange 34. Prior to mounting the wind turbine 10 to the foundation 26, the upper load distribution flange nuts 62 and washers 64 provided on the threaded upper ends 46 of the anchor bolts 36 are removed.

Figure 16:
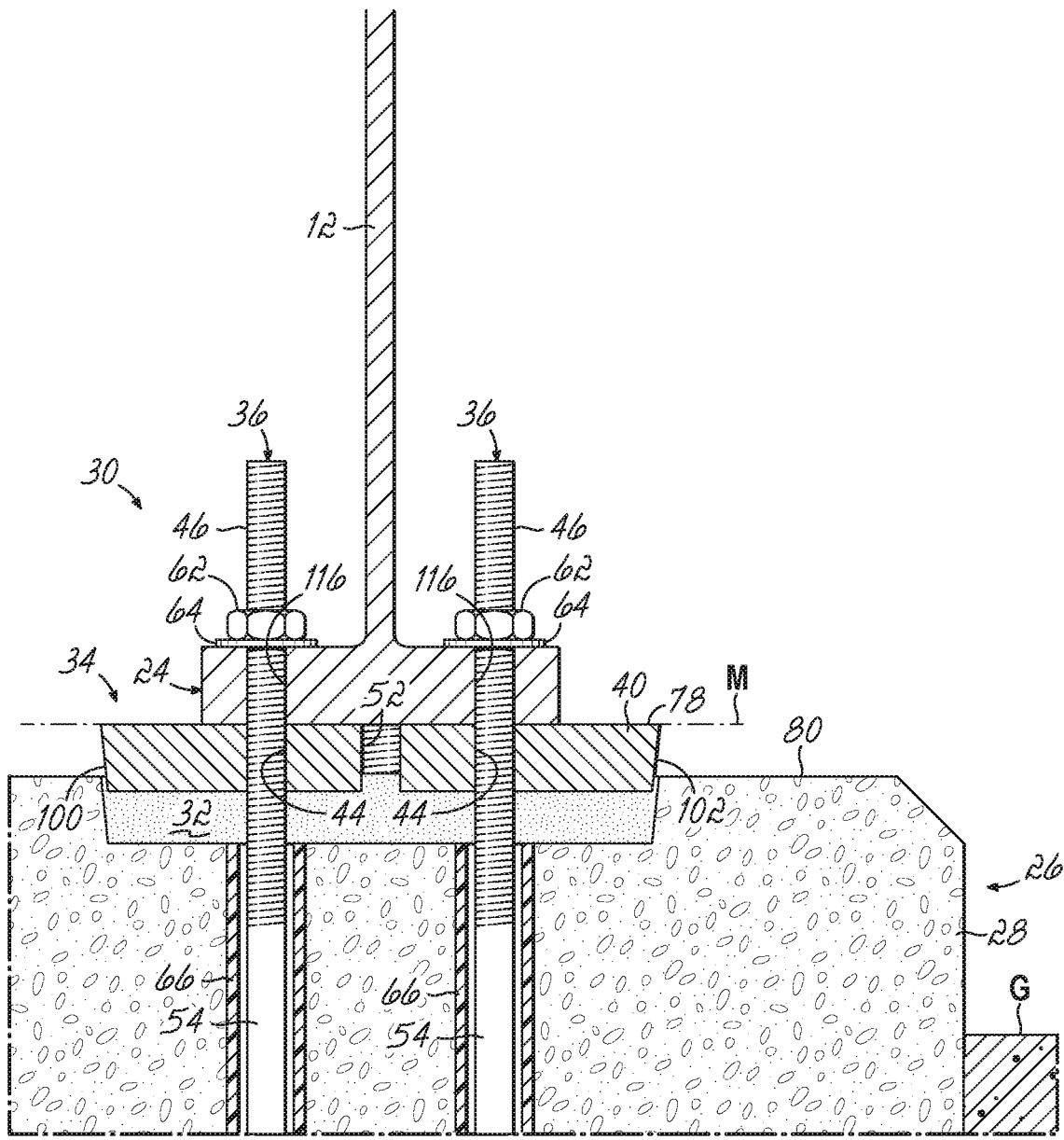
FIG. 16 is an upper radial cross-sectional view showing the completed foundation coupled to and supporting a lower tower flange of the wind turbine.

Referring to FIG. 16, the wind turbine 10 is coupled to the foundation 26 by aligning mounting bores 116 in the lower tower flange 24 with the threaded upper ends 46 of the anchor bolts 36. The wind turbine tower 12 is then lowered until the tower flange 24 directly contacts and is supported by the upper load distribution flange 34. Sets of upper load distribution flange nuts 62 and washers 64, which may be new sets not used during formation of the foundation 26, are then applied to the threaded upper ends 46. The upper load distribution flange nuts 62 are then tightened with a suitable torque. In this manner, the anchor bolts 36 are post-tensioned and maintain the rigid body 28 of the foundation 26 under high compression, thereby enabling the foundation 26 to suitably withstand various forces and moments exerted by the wind turbine 10 during operation.

While the present invention has been illustrated by the description of various embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A method of forming a wind turbine foundation, comprising:
   providing an anchor cage in an excavation pit formed in a ground surface, the anchor cage including an upper flange, a lower flange, and a plurality of anchor bolts extending between the upper and lower flanges;
   directing a first cementitious material into the excavation pit so that the anchor cage becomes at least partially embedded within the first cementitious material;
   allowing the first cementitious material to cure to form a rigid body, wherein the upper flange is partially embedded in the rigid body;
   selectively engaging a connecting element with the upper flange and positioning an actuating element in operative relation with the connecting element, the connecting element and the actuating element positioned in non-contact relation with the anchor bolts;

actuating the actuating element relative to the connecting element and thereby raising the upper flange from the rigid body into a leveled position, such that raising the upper flange from the rigid body creates a trough in the rigid body that is substantially coextensive in dimension with the upper flange;

directing a second cementitious material into the trough beneath the raised upper flange; and allowing the second cementitious material to cure to form a support layer.

2. The method according to claim 1, further comprising:
selectively positioning a plurality of nuts along threaded ends of respective anchor bolts such that the nuts collectively define a level plane,
wherein raising the upper flange into a leveled position includes positioning the upper flange parallel to the level plane while the nuts remain stationary relative to the anchor bolts.

3. The method according to claim 1, wherein actuating the actuating element relative to the connecting element includes rotating the actuating element.

4. The method according to claim 3, wherein rotating the actuating element relative to the connecting element includes rotating a nut relative to a threaded rod coupled to the upper flange.

5. The method according to claim 1, further comprising:
providing at least one leveling device at a position spaced above the upper flange, the at least one leveling device being supported on the anchor bolts,
wherein raising the upper flange into a leveled position includes raising the upper flange to contact the leveling device.

6. The method according to claim 1, wherein the upper flange is circular and actuating the actuating element includes rotating a plurality of circumferentially spaced threaded elements, the threaded elements positioned at circumferential positions along the upper flange.

7. The method according to claim 1, wherein the upper flange includes a plurality of bores and directing the second cementitious material into the trough beneath the raised upper flange includes directing the second cementitious material through the bores.

8. A method of erecting a wind turbine including a tower having a lower portion, comprising:
forming a wind turbine foundation according to claim 1; and
coupling the lower portion of the wind turbine to the anchor bolts.

9. The method according to claim 8, wherein coupling the lower portion of the wind turbine to the anchor bolts includes supporting the wind turbine on the upper flange and supporting the upper flange on the support layer.

10. A method of forming a wind turbine foundation, comprising:
providing an anchor cage in an excavation pit formed in a ground surface, the anchor cage including an upper flange, a lower flange, and a plurality of anchor bolts extending between the upper and lower flanges;
directing a first cementitious material into the excavation pit so that the anchor cage becomes at least partially embedded within the first cementitious material;
allowing the first cementitious material to cure to form a rigid body;
selectively positioning a plurality of nuts along threaded ends of respective anchor bolts such that the nuts collectively define a level reference plane;
providing at least one leveling device at a position spaced above the upper flange, the at least one leveling device being supported on the anchor bolts by the nuts;
selectively engaging a connecting element with the upper flange and positioning an actuating element in operative relation with the connecting element, the connecting element and the actuating element positioned in non-contact relation with the anchor bolts;
actuating the actuating element relative to the connecting element and thereby raising the upper flange from the rigid body into a leveled position, such that raising the upper flange from the rigid body creates a trough in the rigid body, wherein raising the upper flange into a leveled position includes raising the upper flange to directly contact the leveling device, contact between the upper flange and the leveling device indicating that the upper flange has achieved the leveled position;
directing a second cementitious material into a trough beneath the raised upper flange; and
allowing the second cementitious material to cure to form a support layer.

11. The method according to claim 10,
wherein raising the upper flange into a leveled position includes positioning the upper flange parallel to the level reference plane while the nuts remain stationary relative to the anchor bolts.

12. The method according to claim 10, wherein actuating the actuating element relative to the connecting element includes rotating the actuating element.

13. The method according to claim 12, wherein rotating the actuating element relative to the connecting element includes rotating a nut relative to a threaded rod coupled to the upper flange.

14. The method according to claim 10, wherein the upper flange includes a plurality of bores and directing the second cementitious material into the trough beneath the raised upper flange includes directing the second cementitious material through the bores.

15. A method of erecting a wind turbine including a tower having a lower portion, comprising:
forming a wind turbine foundation according to claim 10; and
coupling the lower portion of the wind turbine to the anchor bolts.

16. The method according to claim 15, wherein coupling the lower portion of the wind turbine to the anchor bolts includes supporting the wind turbine on the upper flange and supporting the upper flange on the support layer.

17. The method according to claim 10, wherein the upper flange is circular and actuating the actuating element includes rotating a plurality of circumferentially spaced threaded elements, the threaded elements positioned at circumferential positions along the upper flange.

* * * * *